OR 3,992,085

United States
Momiyama

[11] 3,992,085
[45] Nov. 16, 1976

[54] LARGE APERTURE WIDE ANGLE LENS SYSTEM EMPLOYING AN ASPHERICAL SURFACE

[75] Inventor: Kikuo Momiyama, Chofu, Chofu, Japan

[73] Assignee: Canon Kabushiki Kaisha, Tokyo, Japan

[22] Filed: Feb. 21, 1975

[21] Appl. No.: 551,716

Related U.S. Application Data

[63] Continuation of Ser. No. 369,504, June 13, 1973, abandoned.

Foreign Application Priority Data

July 4, 1972   Japan.................. 47-66359

[52] U.S. Cl.................... 350/189; 350/214
[51] Int. Cl.².............. G02B 3/04; G02B 9/64
[58] Field of Search............ 350/189, 214

[56] References Cited
UNITED STATES PATENTS

| | | | |
|---|---|---|---|
| 3,039,361 | 6/1962 | Baker | 350/189 X |
| 3,622,227 | 11/1971 | Shimuzu | 350/214 |
| 3,736,049 | 5/1973 | Shimuzu | 350/214 |

*Primary Examiner*—Paul A. Sacher
*Attorney, Agent, or Firm*—Toren, McGeady and Stanger

[57] ABSTRACT

A large aperture wide angle lens which employs such aspheric surfaces as satisfying the condition of $$B(N_i' - N_i) < 0$$

$$C(N_i' - N_i) < 0,$$

wherein one plane out of the lens group at rear of the diaphragm of a retro-focus type objective lens is made aspheric surface, and the paraxial curvature radius at vertex of said aspheric surface is represented by $R_i$, and X-axis is taken along the proceeding direction of the light beam on the optical axis while Y-axis is taken along the perpendicular direction thereto, and the equation of the aspheric surface is represented by:

$$X = \frac{Y^2}{R_i + R_i\sqrt{1 - \left(\frac{Y}{R_i}\right)^2}} + BY^4 + CY^6 + DI^8 + EY^{10} + \ldots,$$

further the refractive index of the medium in front and in rear of the aspheric surface is shown by $N_i$, $N_i'$.

10 Claims, 16 Drawing Figures

Spherical aberration
Sine condition

FIG. 6B

Astigmatism

FIG. 6C

Distortion

LARGE APERTURE WIDE ANGLE LENS SYSTEM EMPLOYING AN ASPHERICAL SURFACE

This is a Continuation of application Ser. No. 369,504 filed June 13, 1973, now abandoned.

A wide angle lens is often used in an indoor photographing, etc. where spacewise limitation exists, which prohibits photographing at far distance from an object and as the indoor luminosity is not generally sufficient in many cases, it is desired to use a lens having brightness as high as possible. Also a wide angle lens used in a single lens reflex camera is required to have a long back focus, thus a retro-focus type lens is used, but a conventional retro-focus type wide angle lens with the field angle exceeding 80° has only such as maximum brightness as of F: 2.8, not sufficiently meeting the requirement for brightness.

The present invention is intended to obtain a retrofocus type super wide angle large aperture lens with an angle field of 84°, a brightness of F: 1.4 or above, with a back focus reaching 1.4 times the focal distance, yet with a small size but having satisfactory aberration correction. The feature of the invention lies in that one plane out of lens group behind the diaphragm of a retro-focus type objective lens is made as an aspheric surface, and a paraxial curvature radius at a vertex of said aspheric surface is expressed by Ri, and X-axis is taken at the direction of proceeding of light on the optical axis while Y-axis is taken in a direction perpendicular thereto, wherein the equation of the aspheric surface is expressed by:

$$X = \frac{Y^2}{Ri + Ri\sqrt{1 - (\frac{Y}{Ri})^2}} + BY^4 + CY^6 + DY^8 + EY^{10} + \ldots,$$

and the refractive index of the medium before and after the aspheric surface is expressed respectively by Ni, Ni', then the present invention is to satisfy the following conditions:

$B(Ni' - Ni) < 0$ $C(Ni' - Ni) < 0.$

Furthermore, in order to effect the correction of aberration satisfactorily, the following conditions are to be satisfied.

That is, the total lens system consists of three groups, wherein the group I is a lens group with minus refractive power as a whole consisting of a meniscus concave lens, a convex lens, a meniscus concave lens arranged in the order given, the group II is a lens group with plus refractive power as a whole consisting of a biconvex lens and a concave lens arranged in the order given or consisting of a concave lens and a biconvex lens arranged in the order given, and the group III is a lens group with plus refractive power as a whole consisting of a meniscus concave lens comprising a minus lens and a plus lens being put together and two convex lenses arranged in the order given, wherein at least one lens out of the group I or the group II is made of by putting together, and there is a diaphragm between the group II and the group III, further when the following elements are expressed by the code respectively shown below:

L: Total length of the lens system
f: Focal distance of the total system
$f_I$: Focal distance of the group I
$f_{II}$: Focal distance of the group II
$f_{III}$: Focal distance of the group III, then the following conditions are satisfied:

1. $2.3f < L < 3.5f$

2. $1.2f < |f_I| < 3.5f, f_I < 0$

3. $1.2f < f_{II} < 3.0f$

4. $1.0f < f_{III} < 2.5f.$ still further when one plane of the group III is made as an aspheric surface, and a paraxial curvature radius at the vertex of said aspheric surface is expressed by Ri, and X-axis is taken along the proceeding direction of the light on the optical axis while Y-axis is taken along the direction perpendicular thereto, wherein the equation of the aspheric surface is expressed by:

$$X = \frac{Y^2}{Ri + Ri\sqrt{1 - (\frac{Y}{Ri})^2}} + BY^4 + CY^6 + DY^8 + EY^{10} + \ldots.$$

further the refractive index of the medium in front and in rear of the non-spherical surface is expressed by Ni, N', respectively, then the following conditions are satisfied:

5. $\frac{0.001}{f^3} < |B(Ni' - Ni)| < \frac{10}{f^3}, B(Ni' - Ni) < 0$

6. $\frac{0.001}{f^5} < |C(Ni' - Ni)| < \frac{10}{f^5}, C(Ni' - Ni) < 0.$

The retro-focus type lens having minus lens group placed in a front part and plus lens group positioned in a rear part has an asymmetric lens arrangement, making the correction of aberration difficult. Especially the correction of the minus distortion and of the minus coma aberration generated from the minus lens group positioned at a front part is difficult, and when they are to be corrected to make them small, other aberration particularly spherical aberration and flare of off-axis are deteriorated.

Also since it is necessary to make the retro-ratio larger in order to secure required back focus as the angle of field becomes wide that is the focal distance of a lens is short, the asymmetric characteristics of the lens arrangement becomes strong, also because of the necessity to enhance the refractive power of each lens the aberration generated from each lens increases, thus it is difficult to obtain a large aperture lens. While it is necessary to lower the refractive power of each lens in order to cover the above mentioned requirement in a lens system consisting of spherical surfaces only, the total length of lens becomes long as a result, and the diameter of the front lens becomes remarkably large thus it becomes difficult to realize in a practical size.

First, the reason to require the above-mentioned condition (1) that is the condition of $2.3f < L < 3.5f$ about the total length of lens in the present invention is to hold down the diameter of the front lens to practical size and to make the whole system compact, and aspheric surface is used as a means to solve the aberration problems generated as a result of the above. When the upper limit of said condition is exceeded, the diameter of the front lens increases to non-practical size, while when a value is lower than the lower limit, good aberration correction cannot be done ever with such aspheric surface as will be described below.

The present invention is to require that the conditions (2), (3), (4) are satisfied, further is based on a condition that aspheric surface is employed, wherein the arrangement of the refractive power of each lens group is to be determined. When the upper limit of the condition (2), $1.2f < |f_I| < 3.5f$, is exceeded, it becomes difficult to hold the total length of lens down to practical size while when the value is lower than the lower limit, the aberration generated from the group I increases thus the possibility to obtain a large aperture lens will be lost. When the refractive power of the group II exceeds the upper limit of the condition (3), $1.2f < f_{II} < 3.0f$, the burden on the refractive power of the group III becomes excessively large and the aberration correction becomes difficult, while the value is lower than the lower limit, the minus spherical aberration generated in the group II increases and it is difficult to obtain a large aperture lens. The condition (4), $1.0f < f_{III} < 2.5f$, is to give comparatively strong refractive power to the group III in relation to the group I and the group II in order to obtain a long back focus, and when the upper limit of this condition is exceeded sufficient back focus cannot be obtained, while when the value is lower than the lower limit the minus spherical aberration generated in the group III increases thus a large aperture lens becomes difficult to obtain.

The present invention is to effect such aberration correction as required for a large aperture lens by using an aspheric surface. In this case while greater effect may be obtained if aspheric surfaces are used in many surfaces as the freedom for aberration correction increases, it is desired that small number of aspheric surfaces is used effectively as the manufacture of aspheric surface is difficult and costs high. The present invention is, in view of the above, to secure sufficient effect while limiting the use of an aspheric surface to one surface only. When aspheric surface is used, the minus spherical aberration, minus distortion, minus coma aberration and flare of off-axis which remain as a result must be effectively corrected simultaneously. But when the aspheric surface is employed in the group I or the group II the correction of distortion and of coma aberration results in an increase in the spherical aberration and of off-axis, thus it is not suitable for a large aperture lens. Contrary to the above when the aspheric surface is used in the group III in the rear of the diaphragm, it is possible to correct the above-mentioned remaining aberrations with satisfactory balance, and particularly when it is used in an image side convex plane of the cemented lens, the balance of the correction of the aberration of on-axis and the aberration of off-axis becomes satisfactory. And in this case when the shape of the aspheric surface is so made as satisfying the following conditions in connection with the fourth and the sixth coefficients of the aspheric surface equations as in the conditions (5), (6), best results can be obtained:

5. $\dfrac{0.001}{f^3} < |B(Ni' - Ni)| < \dfrac{10}{f^3}$, $B(Ni' - Ni) < 0$

6. $\dfrac{0.001}{f^5} < |C(Ni' - Ni)| < \dfrac{10}{f^5}$, $C(Ni' - Ni) < 0$.

The fourth and the sixth coefficients affect the aberration, being mutually related to each other, and when the fourth coefficient is lower than the lower limit of the condition (5), the correction of the minus spherical aberration in the middle zone of luminous flux, the minus coma aberration in the middle part of the image field, and the minus distortion cannot be done sufficiently, while when it exceeds the upper limit, the coma aberration of the middle part of the image field and the astigmatism will have excessive correction and is not desirable. Also when the sixth coefficient becomes lower than the lower limit of the condition (6), the correction of the minus spherical aberration in the periphery of luminous flux, the minus coma aberration of the corner of the image field, and the flare of off-axis cannot be done sufficiently, while when it exceeds the upper limit the spherical aberration in the marginal zone of luminous flux will have excessive correction, thus it is not desirable.

When the above-conditions are satisfied, it becomes possible to obtain a retro-focus type wide angle lens having an angle of field of 84°, a brightness of F: 1.4 or above, a back focus of 1.4 or above, and of small size yet having satisfactory correction of various aberrations. Further, the following points should better be taken into consideration to secure best aberration correction. First, the curvature radius $R_I$ convex at image side of a convex lens in the group I is made to be $$-0.4f < \dfrac{1}{R_{I\ center}} < 0.$$

This is to correct at this point to some extent the distortion which is apt to occur in the group I. When the upper limit of the above is exceeded the correction effect of the distortion becomes small while the lateral luminous flux in periphery at said plane will be excessively bent when the value is lower than the lower limit, and the diameter of the front lens becomes large, thus not desirable. Secondly, the curvature radius at image side of the convex lens at the group II is made to $$0.3 \dfrac{1}{f} < \left| \dfrac{1}{R_{II\ center}} \right| < 1.0 \dfrac{1}{f}, \quad R_{II\ center} < 0.$$

This is to correct to some extent at this point the minus distortion and the minus coma aberration. When it is lower than the lower limit of the above the correction effect of the distortion and the coma aberration is lost while the marginal rays on the axis excessively converges at this plane resulting in deterioration of the high order spherical aberration, thus not advantageous for obtaining a large aperture lens. Thirdly, the mean value of the refractive index of the convex lens in the group III is made larger than 1.65. This is effective to correct the spherical aberration which is apt to be deteriorated in the group III and to improve the Petzval sum which is apt to be deteriorated in this arrangement.

Next examples of figures of various data on the lens of the present invention shall be shown.

R: Curvature radius of each refractive plane in order (but asterisk * mark indicates paraxial curvature radius at the vertex of aspheric surface).
    D: Thickness of axis or air gap of each lens in order
    N: Refractive index of glass composing each lens in order
    V: Abbe factor of glass composing each lens in order The present invention will be clear from the following examples with reference to the attached drawings.

| Coefficient of aspheric surface | Y | X |
|---|---|---|
| $B = 0.20647 \times 10^{-4}$ | 0 | 0 |
| $C = 0.36845 \times 10^{-7}$ | 1.225 | 0.02237 |
| $D = -0.80225 \times 10^{-10}$ | 2.450 | 0.08899 |
| $E = 0.52622 \times 10^{-13}$ | 3.675 | 0.19841 |
|  | 4.900 | 0.34804 |
|  | 6.125 | 0.53406 |
|  | 7.350 | 0.75115 |
|  | 8.575 | 0.99244 |
|  | 9.800 | 1.24937 |
|  | 11.205 | 1.51179 |
|  | 12.250 | 1.76822 |
|  | 13.475 | 2.00625 |
|  | 14.700 | 2.21315 |

$f_I = -43.614$
$f_{II} = 44.702$
$f_{III} = 33.572$
Back focus = 36.500

Coefficient of aberration in Example 1.

| NO. | I | II | III | P | V |
|---|---|---|---|---|---|
| 1 | 0.0271 | 0.0256 | 0.0241 | 0.1810 | 0.1932 |
| 2 | −0.9128 | 0.3235 | −0.1147 | −0.4024 | 0.1833 |
| 3 | 0.0431 | 0.0629 | 0.0918 | 0.0212 | 0.1651 |
| 4 | −0.0005 | 0.0030 | −0.0201 | 0.0886 | −0.4572 |
| 5 | 0.1931 | 0.1018 | 0.0537 | 0.2451 | 0.1575 |
| 6 | 0.0000 | −0.0009 | 0.0166 | −0.0121 | −0.0838 |
| 7 | −3.5278 | 0.1483 | −0.0062 | −0.4966 | 0.0211 |
| 8 | 2.7635 | 0.6205 | 0.1393 | 0.3541 | 0.1108 |
| 9 | 3.0653 | −1.6420 | 0.8795 | 0.2597 | −0.6103 |
| 10 | −1.0516 | 0.7844 | −0.5852 | −0.0771 | 0.4940 |
| 11 | −0.0702 | −0.0691 | −0.0680 | −0.2568 | −0.3196 |
| 12 | −3.1371 | 0.6069 | −0.1174 | −0.6893 | 0.1561 |
| 13 | −0.0853 | −0.0538 | −0.0339 | −0.0025 | −0.0230 |
| 14 | −7.2137 | −1.9049 | −0.5991 | 0.3189 | −0.4731 |
| 15 | 0.0436 | 0.1123 | 0.2893 | −0.0800 | 0.5395 |
| 16 | 2.7144 | −0.1320 | 0.0064 | 0.4182 | −0.0207 |
| 17 | −0.3225 | 0.1651 | −0.0845 | −0.1336 | 0.1117 |
| 18 | 7.9992 | 0.8450 | 0.0893 | 0.3839 | 0.0500 |
| Σ | 0.5280 | −0.0033 | −0.0391 | 0.1202 | 0.1946 |

EXAMPLE 1

$f = 24.5 \quad F: 1.4 \quad \omega = \pm 42°$

| | | | |
|---|---|---|---|
| $R_1 = 50.193$ | | | |
| | $D_1 = 1.500$ | $N_1 = 1.58913$ | $V_1 = 61.1$ |
| $R_2 = 22.569$ | | | |
| | $D_2 = 11.000$ | | |
| $R_3 = 428.240$ | | | |
| | $D_3 = 4.000$ | $N_2 = 1.58913$ | $V_2 = 61.1$ |
| $R_4 = -102.530$ | | | |
| | $D_4 = 2.000$ | | |
| $R_5 = 44.584$ | | | |
| | $D_5 = 3.000$ | $N_3 = 1.80518$ | $V_3 = 25.4$ |
| $R_6 = 152.276$ | | | |
| | $D_6 = 1.500$ | $N_4 = 1.58913$ | $V_4 = 61.1$ |
| $R_7 = 18.288$ | | | |
| | $D_7 = 10.437$ | | |
| $R_8 = 28.795$ | | | |
| | $D_8 = 7.000$ | $N_5 = 1.71300$ | $V_5 = 54.0$ |
| $R_9 = -39.264$ | | | |
| | $D_9 = 0.200$ | | |
| $R_{10} = -117.870$ | | | |
| | $D_{10} = 1.500$ | $N_6 = 1.58921$ | $V_6 = 41.1$ |
| $R_{11} = 35.370$ | | | |
| | $D_{11} = 10.681$ | | |
| $R_{12} = -15.854$ | | | |
| | $D_{12} = 1.000$ | $N_7 = 1.80518$ | $V_7 = 25.4$ |
| $R_{13} = 99.094$ | | | |
| | $D_{13} = 4.500$ | $N_8 = 1.77250$ | $V_8 = 49.6$ |
| $R_{14} = -33.487$ * | | | |
| | $D_{14} = 0.150$ | | |
| $R_{15} = -133.553$ | | | |
| | $D_{15} = 5.000$ | $N_9 = 1.77250$ | $V_9 = 49.6$ |
| $R_{16} = -25.530$ | | | |
| | $D_{16} = 0.150$ | | |
| $R_{17} = -79.919$ | | | |
| | $D_{17} = 6.000$ | $N_{10} = 1.77250$ | $V_{10} = 49.6$ |
| $R_{18} = -27.816$ | | | |

EXAMPLE 2

$f = 24.5 \quad F: 1.4 \quad \omega = \pm 42°$

| | | | |
|---|---|---|---|
| $R_1 = 51.399$ | | | |
| | $D_1 = 1.500$ | $N_1 = 1.58913$ | $V_1 = 61.1$ |
| $R_2 = 23.989$ | | | |
| | $D_2 = 10.500$ | | |
| $R_3 = 146.244$ | | | |
| | $D_3 = 4.000$ | $N_2 = 1.58913$ | $V_2 = 61.1$ |
| $R_4 = -123.350$ | | | |
| | $D_4 = 2.000$ | | |
| $R_5 = 36.242$ | | | |
| | $D_5 = 3.000$ | $N_3 = 1.80518$ | $V_3 = 25.4$ |
| $R_6 = 179.177$ | | | |
| | $D_6 = 1.500$ | $N_4 = 1.58913$ | $V_4 = 61.1$ |
| $R_7 = 16.966$ | | | |
| | $D_7 = 8.297$ | | |
| $R_8 = -37.872$ | | | |
| | $D_8 = 1.500$ | $N_5 = 1.59270$ | $V_5 = 35.6$ |
| $R_9 = 102.608$ | | | |
| | $D_9 = 0.200$ | | |
| $R_{10} = 31.802$ | | | |
| | $D_{10} = 5.500$ | $N_6 = 1.71300$ | $V_6 = 54.0$ |
| $R_{11} = -39.227$ | | | |
| | $D_{11} = 11.972$ | | |
| $R_{12} = -15.730$ | | | |
| | $D_{12} = 1.000$ | $N_7 = 1.80518$ | $V_7 = 25.4$ |
| $R_{13} = 131.434$ | | | |
| | $D_{13} = 5.742$ | $N_8 = 1.77250$ | $V_8 = 49.6$ |
| $R_{14} = -34.176$ * | | | |
| | $D_{14} = 0.150$ | | |
| $R_{15} = -159.831$ | | | |
| | $D_{15} = 5.000$ | $N_9 = 1.77250$ | $V_9 = 49.6$ |
| $R_{16} = -25.585$ | | | |
| | $D_{16} = 0.150$ | | |
| $R_{17} = -60.981$ | | | |
| | $D_{17} = 5.500$ | $N_{10} = 1.77250$ | $V_{10} = 49.6$ |

3,992,085

-continued

| f = 24.5  F: 1.4  ω = ± 42° | | |
|---|---|---|
| $R_{18} = -27.134$ | | |

Coefficient of aspheric surface

|  | Y | X |
|---|---|---|
| $B = 0.21699 \times 10^{-4}$ | 0 | 0 |
| $C = 0.35319 \times 10^{-7}$ | 1.225 | 0.02191 |
| $D = -0.92699 \times 10^{-10}$ | 2.450 | 0.08714 |
| $E = 0.61850 \times 10^{-13}$ | 3.675 | 0.19412 |
|  | 4.900 | 0.34012 |
|  | 6.125 | 0.52111 |
|  | 7.350 | 0.73157 |
|  | 8.575 | 0.96445 |
|  | 9.800 | 1.21115 |
|  | 11.025 | 1.46170 |
|  | 12.250 | 1.70517 |
|  | 13.475 | 1.93029 |
|  | 14.700 | 2.12630 |

$f_I = -60.406$
$f_{II} = 50.558$
$f_{III} = 33.911$
Back focus = 36.500

Coefficient of aberration in Example 2.

| NO. | I | II | III | P | V |
|---|---|---|---|---|---|
| 1 | 0.0253 | 0.0256 | 0.0260 | 0.1767 | 0.2058 |
| 2 | −0.7385 | 0.2073 | −0.0582 | −0.3786 | 0.1226 |
| 3 | 0.0664 | 0.0738 | 0.0821 | 0.0621 | 0.1603 |
| 4 | 0.0003 | −0.0019 | 0.0118 | 0.0736 | −0.5221 |
| 5 | 0.1984 | 0.1011 | 0.0515 | 0.3015 | 0.1799 |
| 6 | 0.0032 | −0.0118 | 0.0432 | −0.0103 | −0.1199 |
| 7 | −2.6343 | −0.0781 | −0.0023 | −0.5354 | −0.0159 |
| 8 | 0.0112 | −0.0253 | 0.0574 | −0.2407 | 0.4152 |
| 9 | −1.6542 | −0.7077 | −0.3027 | −0.0889 | −0.1675 |
| 10 | 4.9272 | 1.1630 | 0.2745 | 0.3206 | 0.1405 |
| 11 | 0.5157 | −0.4080 | 0.3228 | 0.2600 | −0.4611 |
| 12 | −3.3491 | 0.5285 | −0.0834 | −0.6947 | 0.1228 |
| 13 | −0.0608 | −0.0442 | −0.0321 | −0.0019 | −0.0247 |
| 14 | −7.7454 | −2.4780 | −0.8642 | 0.3124 | −0.5664 |
| 15 | 0.0364 | 0.0994 | 0.2714 | −0.0668 | 0.5584 |
| 16 | 3.2324 | 0.0654 | 0.0013 | 0.4173 | 0.0085 |
| 17 | −0.6685 | 0.1833 | −0.0503 | −0.1751 | 0.0618 |
| 18 | 8.2953 | 1.3124 | 0.2076 | 0.3935 | 0.0951 |
| Σ | 0.4611 | 0.0049 | −0.0436 | 0.1255 | 0.1931 |

EXAMPLE 3

| f = 24.5  F: 1.4  ω = ± 42° | | |
|---|---|---|
| $R_1 = 58.377$ | | |
| $D_1 = 1.500$ | $N_1 = 1.58913$ | $V_1 = 61.1$ |
| $R_2 = 22.505$ | | |
| $D_2 = 10.000$ | | |
| $R_3 = 85.255$ | | |
| $D_3 = 4.500$ | $N_2 = 1.58913$ | $V_2 = 61.1$ |
| $R_4 = -101.797$ | | |
| $D_4 = 2.000$ | | |
| $R_5 = 61.083$ | | |
| $D_5 = 1.500$ | $N_3 = 1.58913$ | $V_3 = 61.1$ |
| $R_6 = 19.598$ | | |
| $D_6 = 8.139$ | | |
| $R_7 = 26.570$ | | |
| $D_7 = 3.000$ | $N_4 = 1.80518$ | $V_4 = 25.4$ |
| $R_8 = 62.807$ | | |
| $D_8 = 7.960$ | $N_5 = 1.58913$ | $V_5 = 61.1$ |
| $R_9 = -36.357$ | | |
| $D_9 = 0.200$ | | |
| $R_{10} = -177.303$ | | |
| $D_{10} = 1.500$ | $N_6 = 1.60562$ | $V_6 = 43.7$ |
| $R_{11} = 36.089$ | | |
| $D_{11} = 9.669$ | | |
| $R_{12} = -14.680$ | | |
| $D_{12} = 1.000$ | $N_7 = 1.80518$ | $V_7 = 25.4$ |
| $R_{13} = 43.066$ | | |
| $D_{13} = 5.500$ | $N_8 = 1.77250$ | $V_8 = 49.6$ |
| $R_{14} = -34.315$ * | | |
| $D_{14} = 0.150$ | | |
| $R_{15} = -86.111$ | | |
| $D_{15} = 4.500$ | $N_9 = 1.77250$ | $V_9 = 49.6$ |
| $R_{16} = -27.367$ | | |
| $D_{16} = 0.150$ | | |
| $R_{17} = -288.678$ | | |
| $D_{17} = 6.000$ | $N_{10} = 1.77250$ | $V_{10} = 49.6$ |
| $R_{18} = -27.467$ | | |

Coefficient of aspheric surface

|  | Y | X |
|---|---|---|
| $B = 0.18703 \times 10^{-4}$ | 0 | 0 |
| $C = 0.33568 \times 10^{-7}$ | 1.225 | 0.02183 |
| $D = -0.46676 \times 10^{-10}$ | 2.450 | 0.08689 |
| $E = 0.23254 \times 10^{-13}$ | 3.675 | 0.19386 |
|  | 4.900 | 0.34042 |
|  | 6.125 | 0.52305 |
|  | 7.350 | 0.73691 |
|  | 8.575 | 0.97552 |
|  | 9.800 | 1.23068 |
|  | 11.025 | 1.49228 |
|  | 12.250 | 1.74832 |
|  | 13.475 | 1.98497 |
|  | 14.700 | 2.18683 |

$f_I = -40.346$
$f_{II} = 40.756$
$f_{III} = 31.880$
Back focus = 36.500

Coefficient of aberration in Example 3.

| NO. | I | II | III | P | V |
|---|---|---|---|---|---|
| 1 | 0.0172 | 0.0230 | 0.0308 | 0.1556 | 0.2491 |
| 2 | −1.0347 | 0.3300 | −0.1053 | −0.4036 | 0.1623 |
| 3 | 0.1845 | 0.1039 | 0.0585 | 0.1065 | 0.0930 |
| 4 | 0.0037 | −0.0146 | 0.0573 | 0.0892 | −0.5740 |
| 5 | 0.0368 | 0.0444 | 0.0536 | 0.1487 | 0.2443 |
| 6 | −3.4948 | 0.2049 | −0.0120 | −0.4634 | 0.0279 |
| 7 | 3.4821 | 0.4390 | 0.0554 | 0.4113 | 0.0588 |

-continued

| NO. | I | II | III | P | V |
|---|---|---|---|---|---|
| 8 | −0.0032 | −0.0038 | −0.0044 | −0.0294 | −0.0394 |
| 9 | 2.4180 | −1.4033 | 0.8144 | 0.2498 | −0.6176 |
| 10 | −0.6449 | 0.5868 | −0.5338 | −0.0521 | 0.5331 |
| 11 | −0.0472 | −0.0535 | −0.0606 | −0.2561 | −0.3587 |
| 12 | −3.2777 | 0.6837 | −0.1426 | −0.7444 | 0.1850 |
| 13 | −0.1917 | −0.1000 | −0.0522 | −0.0058 | −0.0303 |
| 14 | −6.2570 | −1.6964 | −0.6050 | 0.3112 | −0.5159 |
| 15 | 0.0320 | 0.0986 | 0.3041 | −0.1240 | 0.5557 |
| 16 | 1.0969 | −0.1585 | 0.0229 | 0.3902 | −0.0597 |
| 17 | −0.0046 | 0.0141 | −0.0433 | −0.0370 | 0.2472 |
| 18 | 8.1481 | 0.9152 | 0.1028 | 0.3887 | 0.0552 |
| Σ | 0.4633 | 0.0136 | −0.0595 | 0.1354 | 0.2159 |

EXAMPLE 4

$f = 24.5$   $F: 1.2$   $\omega = 42°$ $R_1 = 52.588$
  $D_1 = 1.500$   $N_1 = 1.58913$   $V_1 = 61.1$
$R_2 = 23.253$
  $D_2 = 11.500$
$R_3 = 259.462$
  $D_3 = 4.000$   $N_2 = 1.58913$   $V_2 = 61.1$
$R_4 = -114.240$
  $D_4 = 2.000$
$R_5 = 62.037$
  $D_5 = 3.000$   $N_3 = 1.80518$   $V_3 = 25.4$
$R_6 = -663.006$
  $D_6 = 1.500$   $N_4 = 1.58913$   $V_4 = 61.1$
$R_7 = 22.020$
  $D_7 = 10.176$
$R_8 = 30.008$
  $D_8 = 8.500$   $N_5 = 1.71300$   $V_5 = 54.0$
$R_9 = -44.126$
  $D_9 = 0.200$
$R_{10} = 205.146$
  $D_{10} = 1.500$   $N_6 = 1.60342$   $V_6 = 38.0$
$R_{11} = 36.176$
  $D_{11} = 10.857$ $R_{12} = -15.970$
  $D_{12} = 1.000$   $N_7 = 1.80518$   $V_7 = 25.4$
$R_{13} = 61.807$
  $D_{13} = 6.000$   $N_8 = 1.77250$   $V_8 = 49.6$
$R_{14} = -34.966$ *
  $D_{14} = 0.150$
$R_{15} = -110.588$
  $D_{15} = 6.000$   $N_9 = 1.77250$   $V_9 = 49.6$
$R_{16} = -28.608$
  $D_{16} = 0.150$
$R_{17} = -172.401$
  $D_{17} = 7.000$   $N_{10} = 1.77250$   $V_{10} = 49.6$
$R_{18} = -30.041$

| Coefficient of aspheric surface | Y | X |
|---|---|---|
| $B = 0.17296 \times 10^{-4}$ | 0 | 0 |
| $C = 0.32608 \times 10^{-7}$ | 1.225 | 0.02143 |
| $D = -0.55526 \times 10^{-10}$ | 2.450 | 0.08531 |
| $E = 0.16503 \times 10^{-13}$ | 3.675 | 0.19043 |
| | 4.900 | 0.33463 |
| | 6.125 | 0.51468 |
| | 7.350 | 0.72607 |
| | 8.575 | 0.96286 |
| | 9.800 | 1.21758 |
| | 11.025 | 1.48119 |
| | 12.250 | 1.74327 |
| | 13.475 | 1.99239 |
| | 14.7 | 2.21674 |
| | 15.925 | 2.40506 |
| | 16.905 | 2.52338 |

$f_I = -48.925$
$f_{II} = 46.714$
$f_{III} = 32.348$
Back focus = 36.500

Coefficient of aberration in Example 4

| NO. | I | II | III | P | V |
|---|---|---|---|---|---|
| 1 | 0.0236 | 0.0237 | 0.0238 | 0.1727 | 0.1972 |
| 2 | −0.8475 | 0.3157 | −0.1176 | −0.3906 | 0.1893 |
| 3 | 0.0532 | 0.0666 | 0.0833 | 0.0350 | 0.1480 |
| 4 | −0.0003 | 0.0024 | −0.0180 | 0.0795 | −0.4542 |
| 5 | 0.0860 | 0.0737 | 0.0631 | 0.1762 | 0.2049 |
| 6 | 0.0033 | −0.0102 | 0.0318 | 0.0028 | −0.1074 |
| 7 | −2.2498 | −0.0036 | −0.0000 | −0.4125 | −0.0007 |
| 8 | 2.1557 | 0.5041 | 0.1179 | 0.3398 | 0.1070 |
| 9 | 2.2146 | −1.3303 | 0.7991 | 0.2311 | −0.6189 |
| 10 | −0.6532 | 0.5828 | −0.5199 | −0.0449 | 0.5039 |
| 11 | −0.0454 | −0.0502 | −0.0554 | −0.2549 | −0.3429 |
| 12 | −2.8419 | 0.5720 | −0.1151 | −0.6843 | 0.1609 |
| 13 | −0.1078 | −0.0666 | −0.0411 | −0.0040 | −0.0279 |
| 14 | −5.9332 | −1.8074 | −0.6365 | 0.3054 | −0.5047 |
| 15 | 0.0190 | 0.0683 | 0.2450 | −0.0966 | 0.5326 |
| 16 | 1.6126 | −0.0934 | 0.0054 | 0.3732 | −0.0219 |
| 17 | −0.0597 | 0.0677 | −0.0766 | −0.0619 | 0.1570 |
| 18 | 7.1664 | 1.1082 | 0.1714 | 0.3554 | 0.0815 |
| Σ | 0.5955 | 0.0234 | −0.0396 | 0.1215 | 0.2039 |

Figure 1:
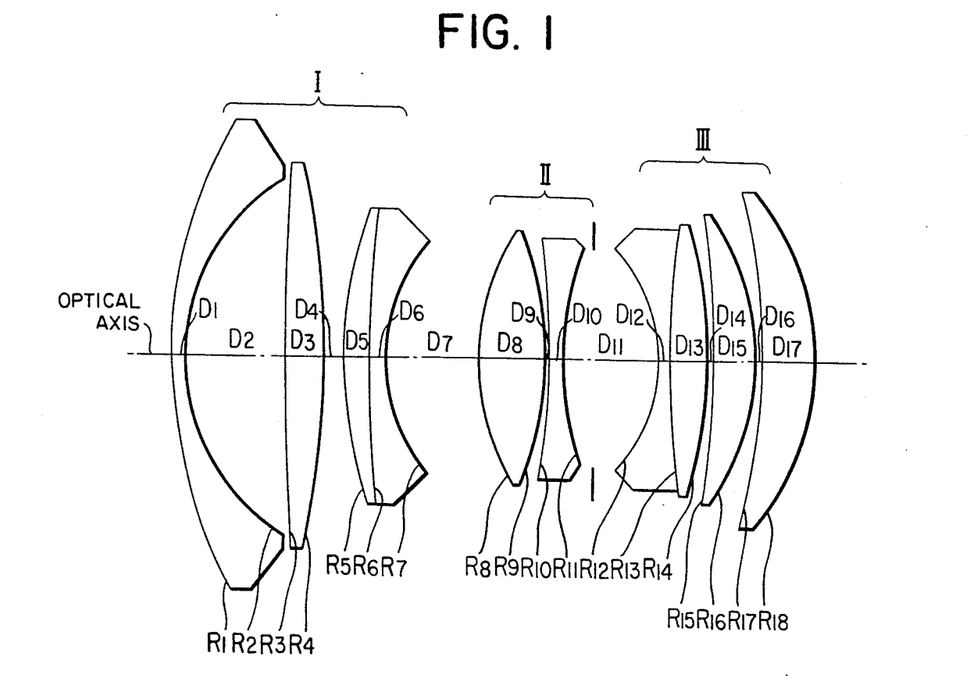
FIG. 1 is an arrangement drawing of the Example 1 of the lens of the present invention.
Figure 2A:
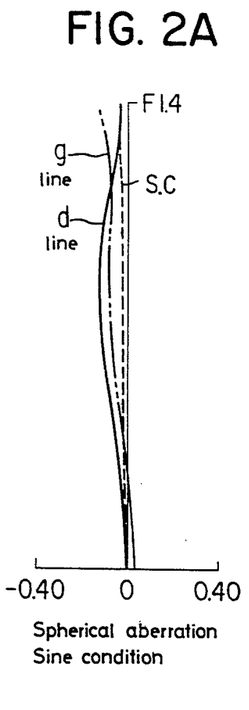
FIGS. 2A, 2B and 2C are aberration drawings of the above-mentioned lens.
Figures 2B, 2C:
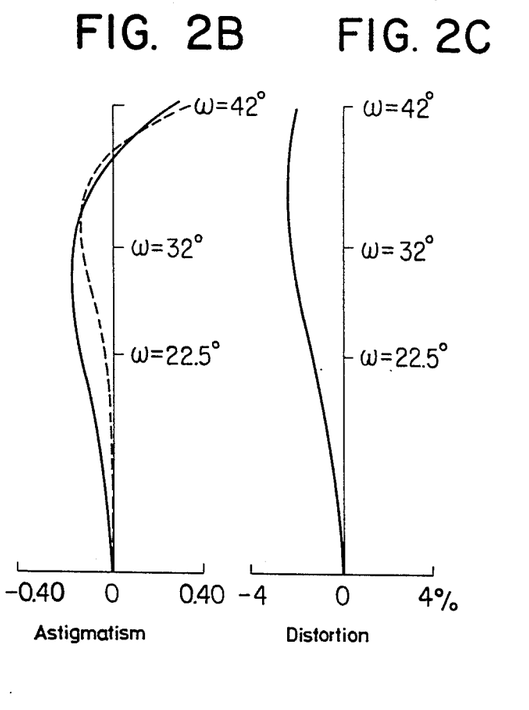
Figure 3:
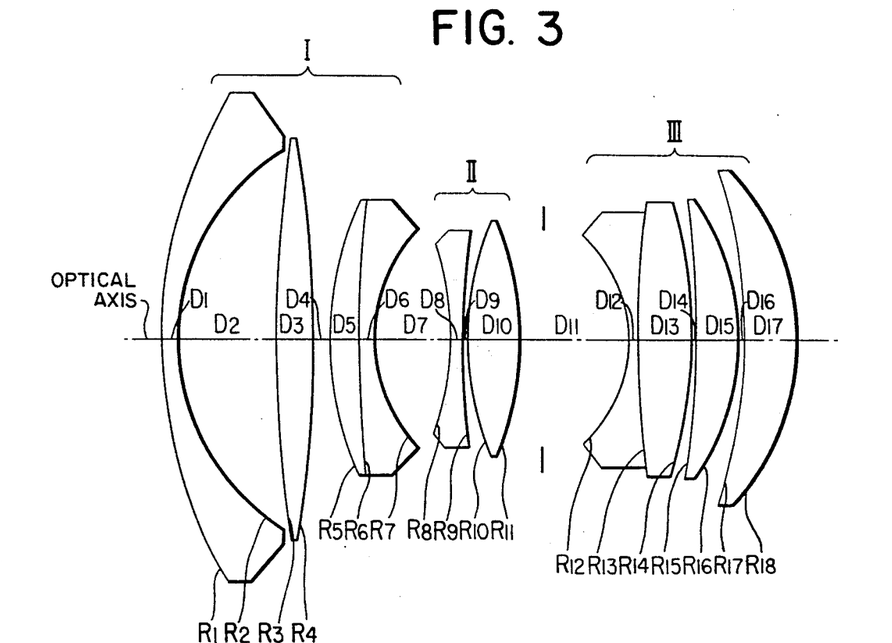
FIG. 3 is an arrangement drawing of the Example 2.
Figure 4A:
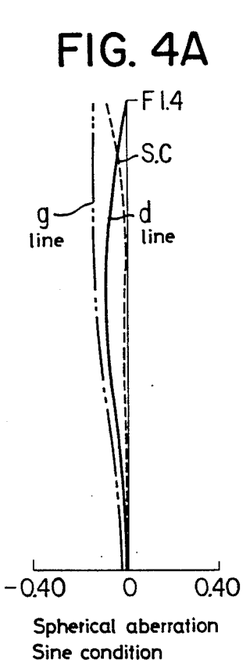
FIGS. 4A, 4B and 4C are aberration drawings of the abovementioned lens.
Figure 4B:
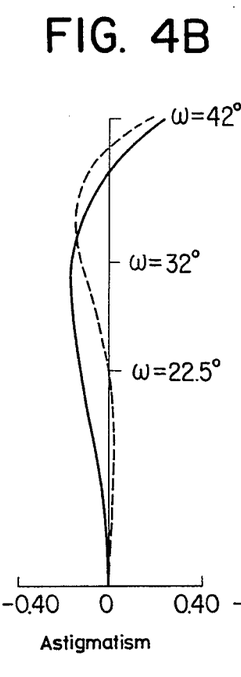
Figure 4C:
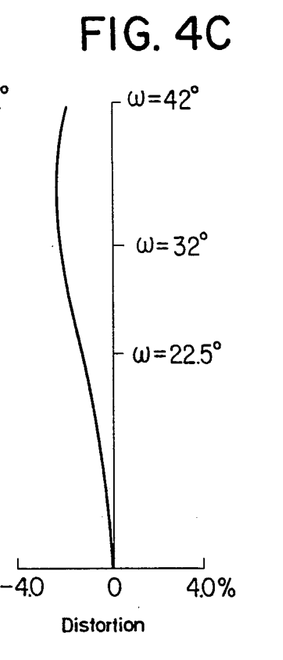
Figure 5:
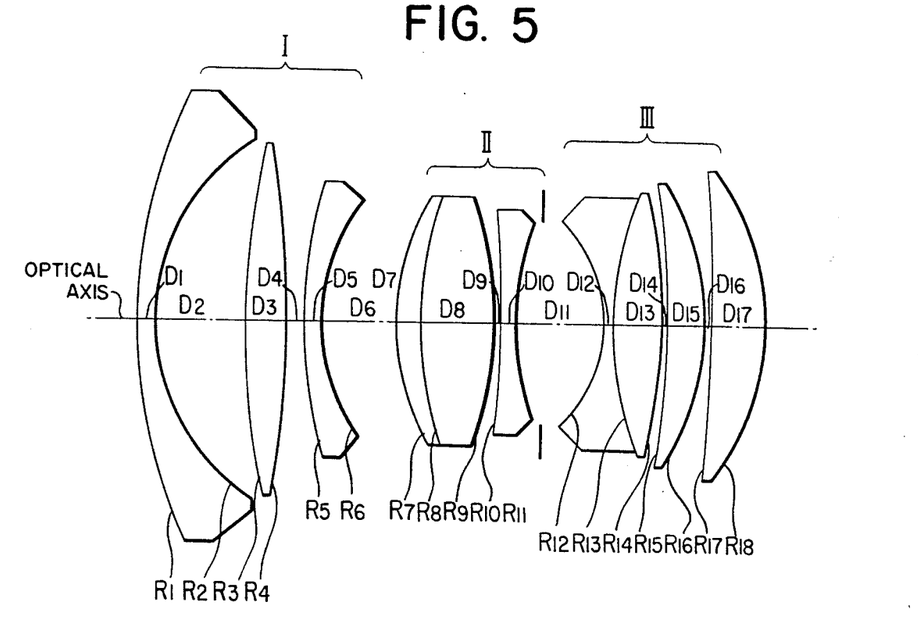
FIG. 5 is an arrangement drawing of Example 3.
Figure 6A:
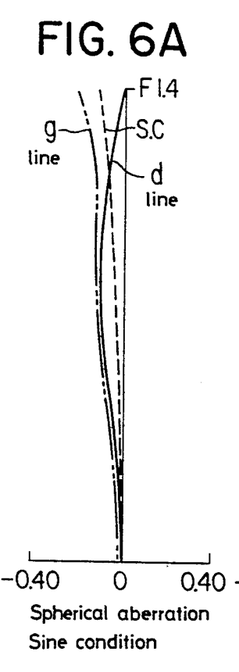
FIGS. 6A, 6B and 6C are aberration drawings of the above-mentioned lens.
Figures 6B, 6C:
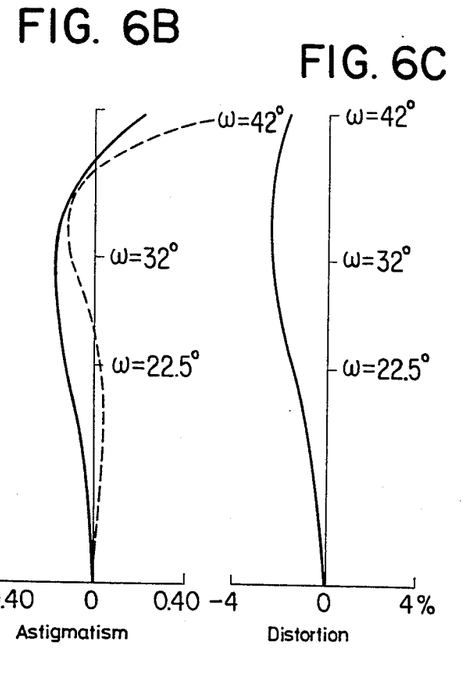
Figure 7:
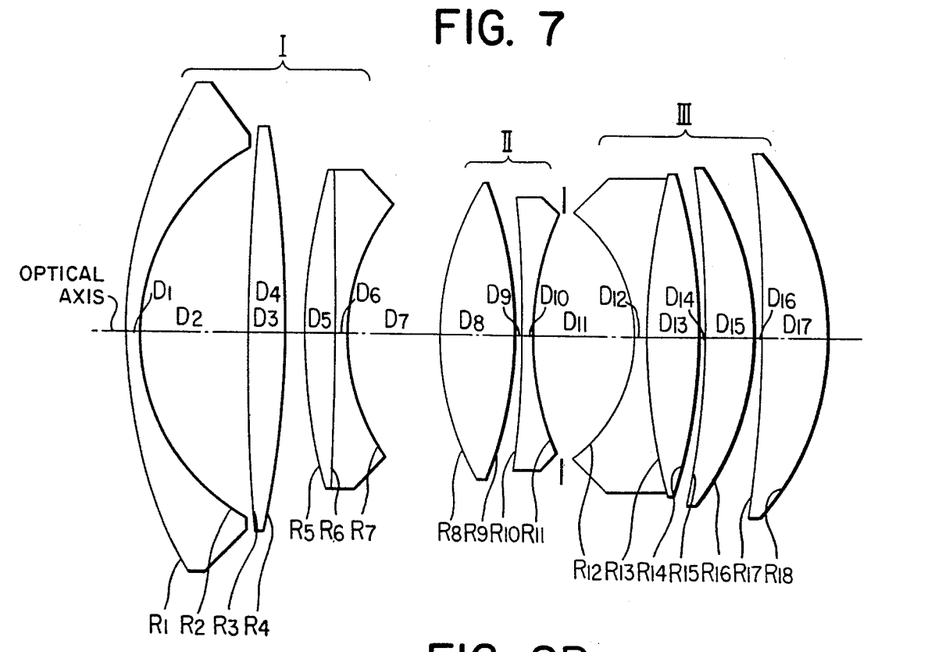
FIG. 7 is an arrangement drawing of the Example 4.
Figure 8A:
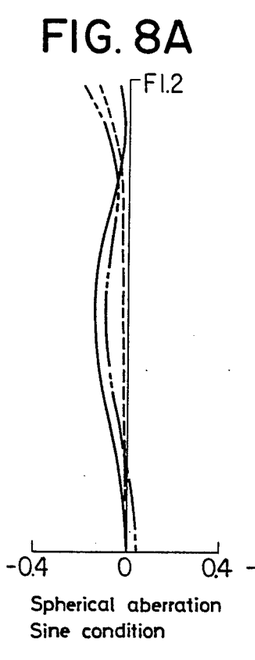
FIGS. 8A, 8B and 8C are aberration drawings of the above-mentioned lens.
Figures 8B, 8C:
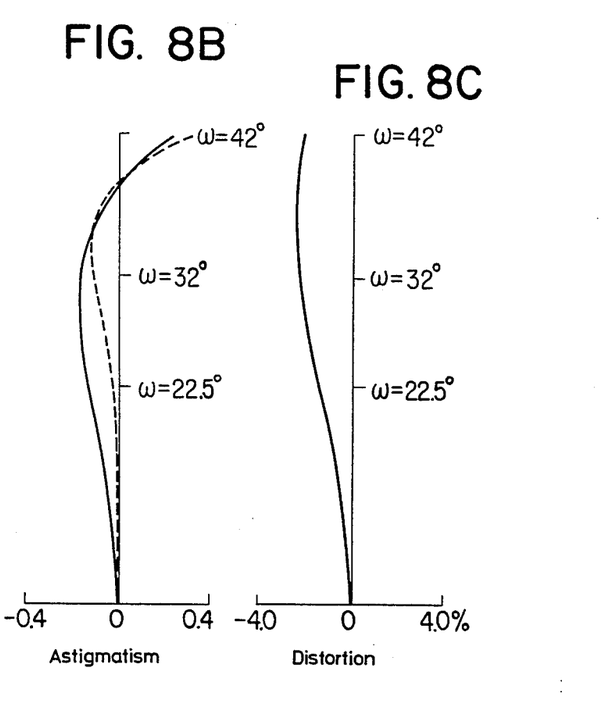

FIG. 2, FIG. 4, FIG. 6, FIG. 8 show the state of aberration correction in each of the above-mentioned Examples 1, 2, 3, 4, respectively, from which it is is learnt that the angle of field is 84°, the brightness reaches F: 1.4 or F: 1.2, and the state of the aberration correction is satisfactory while the back focus is 1.4 $f$ or above.

What is claimed is:

1. A large aperture wide angle lens which employs one aspheric surface comprising:
    a first lens group having a negative refractive power overall and including at least one convex lens,
    a second lens group having an overall positive refractive power and including at least a concave lens and a convex lens, and a third lens group of the retro-focus type having an overall positive refractive power in which a meniscus concave lens with a convex plane thereof faces an image side and is located nearest to said second group, a diaphragm interposed between said second and said third groups, at least one surface of the lenses in said third group at the rear of said diaphragm being aspheric, said aspheric surface being formed in a shape defined by X and Y which are obtained when Y is varied in the following equation:

$$X = \frac{Y^2}{Ri + Ri\sqrt{1-(\frac{Y}{Ri})^2}} + BY^4 + CY^6 + DY^8 + EY^{10} + \ldots$$

$$B(Ni' - Ni) < 0, \quad \frac{0.001}{f^3} < |B(Ni' - Ni)| < \frac{10}{f^3}$$

$$C(Ni' - Ni) < 0, \quad \frac{0.001}{f^5} < |C(Ni' - Ni)| < \frac{10}{f^5}$$

wherein $X$ represents an axis taken along the direction along which a light beam proceeds on the optical axis, $Y$ is an axis to be perpendicular to said $X$-axis, $Ri$ is the paraxial curvature radius at the vertex of the aspheric surface, $Ni$ designates the refractive index of the medium in front of the aspheric surface, $Ni'$ designates the refractive index of the medium at the rear of the aspheric surface, and $f$ represents the focal distance of the overall lens system, the following conditions being satisfied by the wide angle lens;

$$2.74f \leq L < 3.07f$$
$$1.65f \leq |f_I| < 2.46 \quad \text{but } f_I < 0$$
$$1.67f \leq f_{II} < 2.07f$$
$$1.30f \leq f_{III} < 1.40f$$

wherein $L$ represents the overall length of the lens system, $f_I$ designates the focal distance of the first group, $f_{II}$ is the focal distance of the second group and $f_{III}$ is the focal distance of the third group.

2. A large aperture wide angle lens as in claim 1 in which said aspheric surface is located at the image side of the meniscus concave lens in said third group.

3. A large aperture wide angle lens as described in claim 2 specially satisfying the following formulas:

$$-0.25 \frac{1}{f} \leq \frac{1}{R_I \text{ convex}} < -0.19 \frac{1}{f}$$

$$0.55 \frac{1}{f} \leq |\frac{1}{R_{II} \text{ convex}}| < 0.68 \frac{1}{f}$$

wherein $R_I$ convex represents the radius of curvature at the image side of the convex lens in the group I while $R_{II}$ convex expresses the radius of curvature at the image side of the convex lens in group II.

4. A large aperture wide angle lens which employs one aspheric surface comprising:
a first group having negative refractive power;
a second group having positive refractive power;
a third group having positive refractive power
said three groups being arranged in sequence from the object direction to form a retro-focus type lens having a diaphragm interposed between said second and said third groups said first group being composed of a meniscus concave lens having a convex surface facing the object direction, a convex lens, and a meniscus concave lens having a convex surface facing the object direction, said second group having a biconvex lens and a concave lens and said third group having a meniscus concave lens composed of a concave lens and convex lens and with its convex plane facing the image side, at lease one surface of the lenses in said third group being aspheric and having a shape which is given by X and Y obtained when Y varies as in the following formulas:

$$x = \frac{Y^2}{Ri + Ri\sqrt{1-(\frac{Y}{Ri})^2}} + BY^4 + CY^6 + DY^8 + EY^{10} + \ldots$$

$$B(Ni' - Ni) < 0, \quad \frac{0.001}{f^3} < |B(Ni' - Ni)| < \frac{10}{f^3}$$

$$C(Ni' - Ni) < 0, \quad \frac{0.001}{f^5} < |C(Ni' - Ni)| < \frac{10}{f^5}$$

wherein $X$ represents an axis along the direction of the light beam on the optical axis, $Y$ is an axis perpendicular to the $X$-axis, $Ri$ designates the paraxial curvature radius at the vertex of the aspheric surface, $Ni$ is the refractive index of the medium in front of the aspheric surface while $Ni'$ denotes the refractive index of the medium at the rear of the aspheric surface, and $f$ is the focal distance of the whole lens system.

5. A large aperture wide angle lens as in claim 4, in which said aspheric surface is a surface at the image side of the meniscus concave lens in said third group III.

6. A large aperture wide angle lens as in claim 5, wherein said second group is composed of a biconvex lens disposed toward the object direction and the biconcave lens disposed at the image side.

7. A large aperture wide angle lens as in claim 5, wherein said second group is composed of the biconcave lens disposed toward the object direction and the biconvex lens disposed toward the image direction.

8. A large aperture wide angle lens as in claim 5, wherein, substantially,

| | $f = 24.5$ | $F:1.4$ | $\omega = \pm 42°$ |
|---|---|---|---|
| $R_1 = 50.193$ | | | |
| | $D_1 = 1.500$ | $N_1 = 1.58913$ | $V_1 = 61.1$ |
| $R_2 = 22.569$ | | | |
| | $D_2 = 11.000$ | | |
| $R_3 = 428.240$ | | | |
| | $D_3 = 4.000$ | $N_2 = 1.58913$ | $V_2 = 61.1$ |
| $R_4 = -102.530$ | | | |
| | $D_4 = 2.000$ | | |
| $R_5 = 44.584$ | | | |
| | $D_5 = 3.000$ | $N_3 = 1.80518$ | $V_3 = 25.4$ |
| $R_6 = 152.276$ | | | |
| | $D_6 = 1.500$ | $N_4 = 1.58913$ | $V_4 = 61.1$ |
| $R_7 = 18.288$ | | | |
| | $D_7 = 10.437$ | | |
| $R_8 = 28.795$ | | | |
| | $D_8 = 7.000$ | $N_5 = 1.71300$ | $V_5 = 54.0$ |
| $R_9 = -39.264$ | | | |
| | $D_9 = 0.200$ | | |
| $R_{10} = -117.870$ | | | |
| | $D_{10} = 1.500$ | $N_6 = 1.58921$ | $V_6 = 41.1$ |
| $R_{11} = 35.370$ | | | |
| | $D_{11} = 10.681$ | | |
| $R_{12} = -15.854$ | | | |
| | $D_{12} = 1.000$ | $N_7 = 1.80518$ | $V_7 = 25.4$ |
| $R_{13} = 99.094$ | | | |
| | $D_{13} = 4.500$ | $N_8 = 1.77250$ | $V_8 = 49.6$ |
| $R_{14} = -33.487*$ | | | |
| | $D_{14} = 0.150$ | | |
| $R_{15} = -133.553$ | | | |

-continued

| f = 24.5 | F:1.4 | ω = ± 42° | |
|---|---|---|---|
| $D_{15} = 5.000$ | $N_9 = 1.77250$ | $V_9 = 49.6$ | |
| $R_{16} = -25.530$ | | | |
| $D_{16} = 0.150$ | | | |
| $R_{17} = -79.919$ | | | |
| $D_{17} = 6.000$ | $N_{10} = 1.77250$ | $V_{10} = 49.6$ | |
| $R_{18} = -27.816$ | | | | wherein the asterisked (*) surface is an aspheric surface and wherein

| Coefficient of aspheric surface | Y | X |
|---|---|---|
| $B = 0.20647 \times 10^{-4}$ | 0 | 0 |
| $C = 0.36845 \times 10^{-7}$ | 1.225 | 0.02237 |
| $D = -0.80225 \times 10^{-10}$ | 2.450 | 0.08899 |
| $E = 0.52622 \times 10^{-13}$ | 3.675 | 0.19841 |
| | 4.900 | 0.34804 |
| | 6.125 | 0.53406 |
| | 7.350 | 0.75115 |
| | 8.575 | 0.99244 |
| | 9.800 | 1.24937 |
| | 11.025 | 1.51179 |
| | 12.250 | 1.76822 |
| | 13.475 | 2.00625 |
| | 14.700 | 2.21315 |

$f_I = -43.614$
$f_{II} = 44.702$
$f_{III} = 33.572$
Back focus = 36.500

9. A large aperture wide angle lens as described in claim 5, wherein, substantially,

| f = 24.5 | F:1.4 | ω = ± 42° | |
|---|---|---|---|
| $R_1 = 51.399$ | | | |
| $D_1 = 1.500$ | $N_1 = 1.58913$ | $V_1 = 61.1$ | |
| $R_2 = 23.989$ | | | |
| $D_2 = 10.500$ | | | |
| $R_3 = 146.244$ | | | |
| $D_3 = 4.000$ | $N_2 = 1.58913$ | $V_2 = 61.1$ | |
| $R_4 = -123.350$ | | | |
| $D_4 = 2.000$ | | | |
| $R_5 = 36.242$ | | | |
| $D_5 = 3.000$ | $N_3 = 1.80518$ | $V_3 = 25.4$ | |
| $R_6 = 179.177$ | | | |
| $D_6 = 1.500$ | $N_4 = 1.58913$ | $V_4 = 61.1$ | |
| $R_7 = 16.966$ | | | |
| $D_7 = 8.297$ | | | |
| $R_8 = -37.872$ | | | |
| $D_8 = 1.500$ | $N_5 = 1.59720$ | $V_5 = 35.6$ | |
| $R_9 = 102.608$ | | | |
| $D_9 = 0.200$ | | | |
| $R_{10} = 31.802$ | | | |
| $D_{10} = 5.500$ | $N_6 = 1.71300$ | $V_6 = 54.0$ | |
| $R_{11} = -39.227$ | | | |
| $D_{11} = 11.972$ | | | |
| $R_{12} = -15.730$ | | | |
| $D_{12} = 1.000$ | $N_7 = 1.80518$ | $V_7 = 25.4$ | |
| $R_{13} = 131.434$ | | | |
| $D_{13} = 5.742$ | $N_8 = 1.77250$ | $V_8 = 49.6$ | |
| $R_{14} = -34.176$ * | | | |
| $D_{14} = 0.150$ | | | |
| $R_{15} = -159.831$ | | | |
| $D_{15} = 5.000$ | $N_9 = 1.77250$ | $V_9 = 49.6$ | |
| $R_{16} = -25.585$ | | | |
| $D_{16} = 0.150$ | | | |
| $R_{17} = -60.981$ | | | |
| $D_{17} = 5.500$ | $N_{10} = 1.77250$ | $V_{10} = 49.6$ | |
| $R_{18} = -27.134$ | | | | wherein the asterisked (*) surface is an aspheric surface and wherein

| Coefficient of aspheric surface | Y | X |
|---|---|---|
| $B = 0.21699 \times 10^{-4}$ | 0 | 0 |
| $C = 0.35319 \times 10^{-7}$ | 1.225 | 0.02191 |
| $D = -0.92699 \times 10^{-10}$ | 2.450 | 0.08714 |
| $E = 0.61850 \times 10^{-13}$ | 3.675 | 0.19412 |
| | 4.900 | 0.34012 |
| | 6.125 | 0.52111 |
| | 7.350 | 0.73157 |
| | 8.575 | 0.96445 |
| | 9.800 | 1.21115 |
| | 11.025 | 1.46170 |
| | 12.250 | 1.70517 |
| | 13.475 | 1.93029 |
| | 14.700 | 2.12630 |

$f_I = -60.406$
$f_{II} = 50.558$
$f_{III} = 33.911$
Back focus = 36.500

10. A large aperture wide angle lens as described in claim 5, wherein

| f = 24.5 | F:1.4 | ω = ± 42° | |
|---|---|---|---|
| $R_1 = 58.377$ | | | |
| $D_1 = 1.500$ | $N_1 = 1.58913$ | $V_1 = 61.1$ | |
| $R_2 = 22.505$ | | | |
| $D_2 = 10.000$ | | | |
| $R_3 = 85.255$ | | | |
| $D_3 = 4.500$ | $N_2 = 1.58913$ | $V_2 = 61.1$ | |
| $R_4 = -101.797$ | | | |
| $D_4 = 2.000$ | | | |
| $R_5 = 61.083$ | | | |
| $D_5 = 1.500$ | $N_3 = 1.58913$ | $V_3 = 61.1$ | |
| $R_6 = 19.598$ | | | |
| $D_6 = 8.139$ | | | |
| $R_7 = 26.570$ | | | |
| $D_7 = 3.000$ | $N_4 = 1.80518$ | $V_4 = 25.4$ | |
| $R_8 = 62.807$ | | | |
| $D_8 = 7.960$ | $N_5 = 1.58913$ | $V_5 = 61.1$ | |
| $R_9 = -36.357$ | | | |
| $D_9 = 0.200$ | | | |
| $R_{10} = -177.303$ | | | |
| $D_{10} = 1.500$ | $N_6 = 1.60562$ | $V_6 = 43.7$ | |
| $R_{11} = 36.089$ | | | |
| $D_{11} = 9.669$ | | | |
| $R_{12} = -14.680$ | | | |
| $D_{12} = 1.000$ | $N_7 = 1.80518$ | $V_7 = 25.4$ | |
| $R_{13} = 43.066$ | | | |
| $D_{13} = 5.500$ | $N_8 = 1.77250$ | $V_8 = 49.6$ | |
| $R_{14} = -34.315$ * | | | |
| $D_{14} = 0.150$ | | | |
| $R_{15} = -86.111$ | | | |
| $D_{15} = 4.500$ | $N_9 = 1.77250$ | $V_9 = 49.6$ | |
| $R_{16} = -27.367$ | | | |
| $D_{16} = 0.150$ | | | |
| $R_{17} = -288.678$ | | | |
| $D_{17} = 6.000$ | $N_{10} = 1.77250$ | $V_{10} = 49.6$ | |
| $R_{18} = -27.467$ | | | | wherein the asterisked (*) surface is an aspheric surface and wherein

| Coefficient of aspheric surface | Y | X |
|---|---|---|
| $B = 0.18703 \times 10^{-4}$ | 0 | 0 |
| $C = 0.33568 \times 10^{-7}$ | 1.225 | 0.02183 |
| $D = -0.46676 \times 10^{-10}$ | 2.450 | 0.08689 |
| $E = 0.23254 \times 10^{-13}$ | 3.675 | 0.19386 |
| | 4.900 | 0.34042 |
| | 6.125 | 0.52305 |
| | 7.350 | 0.73691 |
| | 8.575 | 0.97552 |
| | 9.800 | 1.23068 |
| | 11.025 | 1.49228 |
| | 12.250 | 1.74832 |
| | 13.475 | 1.98497 |
| | 14.700 | 2.18683 |

$f_I = -40.346$
$f_{II} = 40.756$
$f_{III} = 31.880$
Back focus = 36.500

* * * * *